United States Patent [19]
Cutshall et al.

[11] Patent Number: 5,197,823
[45] Date of Patent: Mar. 30, 1993

[54] METHOD AND APPARATUS FOR TREATING PCB-CONTAINING SOIL

[75] Inventors: Eule R. Cutshall, Colbert County; Gregory Felling, Lauderdale County; Sheila D. Scott, Lauderdale County; Gary S. Tittle, Lauderdale County, all of Ala.

[73] Assignee: Reynolds Metals Company, Richmnod, Va.

[21] Appl. No.: 926,362

[22] Filed: Aug. 10, 1992

Related U.S. Application Data

[63] Continuation of Ser. No. 818,198, Jan. 8, 1992, abandoned.

[51] Int. Cl.$^5$ .............................. A62D 3/00; B01J 8/00
[52] U.S. Cl. .................................. 405/128; 208/262.5; 210/909; 585/266
[58] Field of Search .............. 405/128, 129, 263, 264; 423/DIG. 20; 208/262.5; 210/747, 909; 585/266, 841

[56] References Cited

U.S. PATENT DOCUMENTS

| | | |
|---|---|---|
| 3,640,821 | 2/1972 | Sweeny et al. |
| 4,469,661 | 9/1984 | Shultz .............................. 423/210.5 |
| 4,931,167 | 6/1990 | Wilwerding ...................... 208/262.5 |
| 4,969,775 | 11/1990 | Cappel et al. ........................ 405/128 |
| 5,004,551 | 4/1991 | Sublette .......................... 405/128 X |
| 5,051,030 | 9/1991 | Saha et al. ............................ 405/128 |
| 5,096,600 | 3/1992 | Hoch ....................... 423/DIG. 20 X |

FOREIGN PATENT DOCUMENTS 0170714 2/1986 European Pat. Off. .

Primary Examiner—Randolph A. Reese
Assistant Examiner—Arlen L. Olsen
Attorney, Agent, or Firm—Alan T. McDonald

[57] ABSTRACT

A method and apparatus for treating polychlorinated biphenyl (PCB) contaminated soil includes providing a contaminated soil having PCBs therein and treating the soil with elemental zinc powder. The elemental zinc powder reacts with the PCBs in the contaminated soil to at least partially dechlorinate the PCB component of the soil. Also provide are means for treating the PCB contaminated soil including grinding means for achieving a preferred size range for the soil and mixing means to provide intimate contact between the contaminated soil and elemental zinc powder. The method may be practice in-situ such that the PCB contaminated soil is treated at a soil site containing the PCB contaminants.

10 Claims, 3 Drawing Sheets

METHOD AND APPARATUS FOR TREATING PCB-CONTAINING SOIL

This application is a continuation of application Ser. No. 07/818,198 filed Jan. 8, 1992, now abandoned.

FIELD OF THE INVENTION

The present invention is directed to a method and apparatus for treating PCB-contaminated soil. In the inventive method, PCB-contaminated soil is reacted with zinc powder to effectively dechlorinate the PCB content of the soil.

BACKGROUND ART

In the prior art, various methods and apparatus have been proposed to destroy or dispose of polychlorinated biphenyls, commonly known as PCBs.

Prior to the recognition that PCBs posed a serious threat to the environment, these compounds were utilized in a wide range of applications as a result of their very high stability, in particular, at high temperatures. Although PCBs were used in coatings, lubricants, pumping fluids, their main utility was as dielectric fluids in transformers and capacitors.

As a result of their high stability and extremely slow biodegradation rates, PCBs that enter the environment either in soil or fluids pose a substantial environmental hazard. As a result of the threat posed to the environment by PCBs, legislation has been enacted restricting the use and application thereof as well as providing for eventual disposal.

One method of treating materials containing PCBs is high temperature incineration, with subsequent treatment of the products of combustion to remove hydrogen chloride produced from the breakdown of the PCBs. However, these incineration processes are not 100 percent effective which results in PCBs or equivalent toxic substances being emitted into the atmosphere.

An alternative method of degradation of PCBs is disclosed in U.S. Pat. No. 4,931,167 to Wilwerding. In this method, polychlorinated biphenyls are chemically degraded by contact with a Lewis acid catalyst in a non-aqueous liquid medium, in the presence of a cation which combines with the chlorines on the PCBs to form a solid chloride of the cation which will precipitate from the liquid medium. In this process, the PCB-containing material must have all water removed prior to the degradation process. Moreover, the process is performed using an alcohol solvent and a metal halide Lewis acid such as a metal chloride, metal bromide or a combination thereof.

Another prior art method proposed to dispose of polychlorinated biphenyls is disclosed in U.S. Pat. No. 4,469,661 to Shultz. In this method, solids containing the hazardous halogenated hydrocarbons are subjected to an extraction step to separate the PCBs from the soil or other contaminated material. After the extraction step, the high-boiling hydrocarbon solvent and PCB are vaporized and injected into a molten aluminum bath to form aluminum chloride and destroy the PCBs. European Patent Application Number 0 170 714 to Shultz discloses a similar process as described above for the Shultz patent.

U.S. Pat. No. 3,640,821 to Sweeny et al. discloses a method of reductive degradation of halogenated pesticides, typically DDT, by reacting the pesticides with metallic zinc under mildly acid conditions to produce less highly halogenated degradation products of lower toxicity. In this method, DDT is reacted with an aqueous suspension of finely divided metallic zinc at a pH below about 4 for a period of time sufficient to convert a major portion of the DDT to DDEt. The Sweeny et al. patent indicates that only the aliphatic halogens are removed using their process and a complete dehalogenation of compounds such as DDT is extremely difficult.

Disadvantages associated with these prior art processes include the need for extensive chemical process equipment to effect the degradation or destruction of the PCBs. In the patent to Wilwerding, various mixing and reaction vessels are required to perform the extracting, vaporizing and reacting steps of the process. The Shultz process requires extensive equipment to prepare the PCBs prior to contact with the molten aluminum. In known incineration processes, extensive equipment is required for both the incineration aspect and waste gas treatment aspects of these processes.

In response to these recognized deficiencies in prior art processes, a need has developed to provide an improved in-situ method of disposing of or treating PCB-contaminated soil.

In response to this need, the present invention provides apparatus and a method of treating PCB-contaminated soil which effectively dechlorinates the PCB content of the soil in situ without endangering the surrounding environment.

None of the prior art discussed above teaches or fairly suggests an in-situ process of treating PCB-contaminated soil which results in high levels of reduction in PCBs over a period of time.

SUMMARY OF THE INVENTION

It is accordingly one object of the present invention to provide a method and apparatus for treating PCB-contaminated soil.

It is a further object of the present invention to treat PCB-contaminated soil in an in-situ manner, thereby eliminating extensive processing equipment and numerous process steps to degrade or breakdown the PCBs.

Another object of the present invention is to effectively dechlorinate the PCB content of contaminated soil using zinc powder as the reactant with the various types of polychlorinated biphenyls.

Other objects and advantages of the present invention will be apparent as the description proceeds.

In satisfaction of the foregoing objects and advantages, there is provided by the present invention a method of treating PCB-contaminated soil comprising the steps of providing a soil containing an amount of polychlorinated biphenyls therein, adding an effective amount of elemental zinc powder to the soil, mixing zinc powder with the soil and reacting the zinc powder with the polychlorinated biphenyls to effectively at least partially dechlorinate the polychlorinated biphenyls in the soil. The inventive method may be performed in an in-situ manner such that the reacting step is performed at the soil site which contains the polychlorinated biphenyls. The mixing step may also be performed in-situ, or, alternatively, the contaminated soil may be removed from the soil site, mixed with the zinc powder and returned thereto.

The present invention also provides an apparatus for treating polychlorinated biphenyl contaminated soil which comprises means for removing the contaminated soil from the soil site, means for adding the zinc powder to the soil and mixing thereof, and means to facilitate conducting the reacting step to at least partially dechlorinate the polychlorinated biphenyls.

BRIEF DESCRIPTION OF DRAWINGS

Reference is now made to the Drawings accompanying the application wherein.

DESCRIPTION OF THE PREFERRED EMBODIMENTS

The present invention is directed to a method of and apparatus for treating polychlorinated biphenyl-contaminated soils. The inventive method and apparatus provide advantages over prior art methods and systems presently in use.

The inventive method of treating polychlorinated biphenyl-contaminated soil permits, in one embodiment, in-situ treatment of the contaminated soil. Moreover, the inventive method is practiced under ambient conditions. As a result of the in-situ treatment and operating conditions, the inventive method and apparatus provide economic advantages by eliminating excessive capital and operating costs requirements to build and operate complicated process equipment used in prior art systems.

The inventive method and apparatus also provides minimal adverse effects on the surrounding environment since harmful emissions are not generated during the reaction process. In contrast, prior art incineration systems may emit toxins into the atmosphere as a by-product of the polychlorinated biphenyl destruction.

The method and apparatus of the present invention are also more energy efficient than prior art systems since the operating conditions do not require vaporization, melting of reactants, or other energy intensive processes to degrade the polychlorinated biphenyls contained in the soil.

Figure 1:
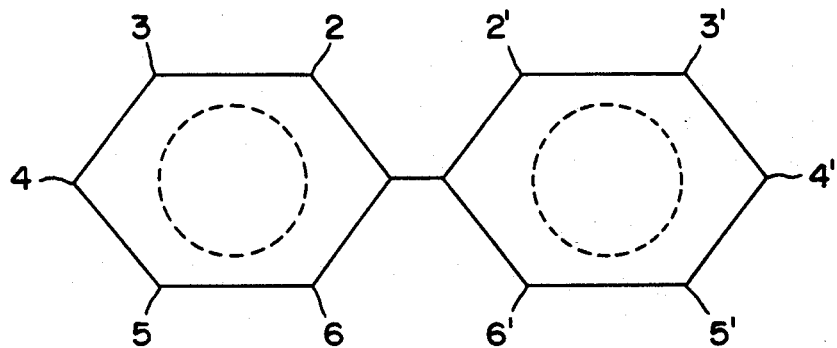
FIG. 1 shows a diagram of a biphenyl structure for polychlorinated biphenyls.

Polychlorinated biphenyl, commonly known as PCB, is a generic name for a family of related compounds. FIG. 1 depicts a diagram of the biphenyl structure. As can be seen from the drawing, and illustrated by numbers 2-6 and their primes, there are ten sites available for the substitution of a chlorine atom for a hydrogen, yielding 209 different PCB congeners. The term "congeners" is used to represent the family of various polychlorinated biphenyl compounds depending on the degree of chlorination thereof. The various polychlorinated biphenyl congeners range from monochlorobiphenyl to decachlorobiphenyl.

Polychlorinated biphenyls have found particular use as dielectric fluids due to their stability at high temperatures. One commercially known type of polychlorinated biphenyl is known as Aroclor ® which was manufactured by Monsanto and sold as mixtures of several congeners. The various types of Aroclors ® are usually designated by four digit numbers with the last two digits of the Aroclor ® referring to the percent chlorine by weight of the mixture. The Aroclors ® are separated by fractional distillation so that the congeners in each Aroclor ® have similar boiling points. Typically, the most chlorinated congeners represent the most persistent environmental problems.

Figure 2:
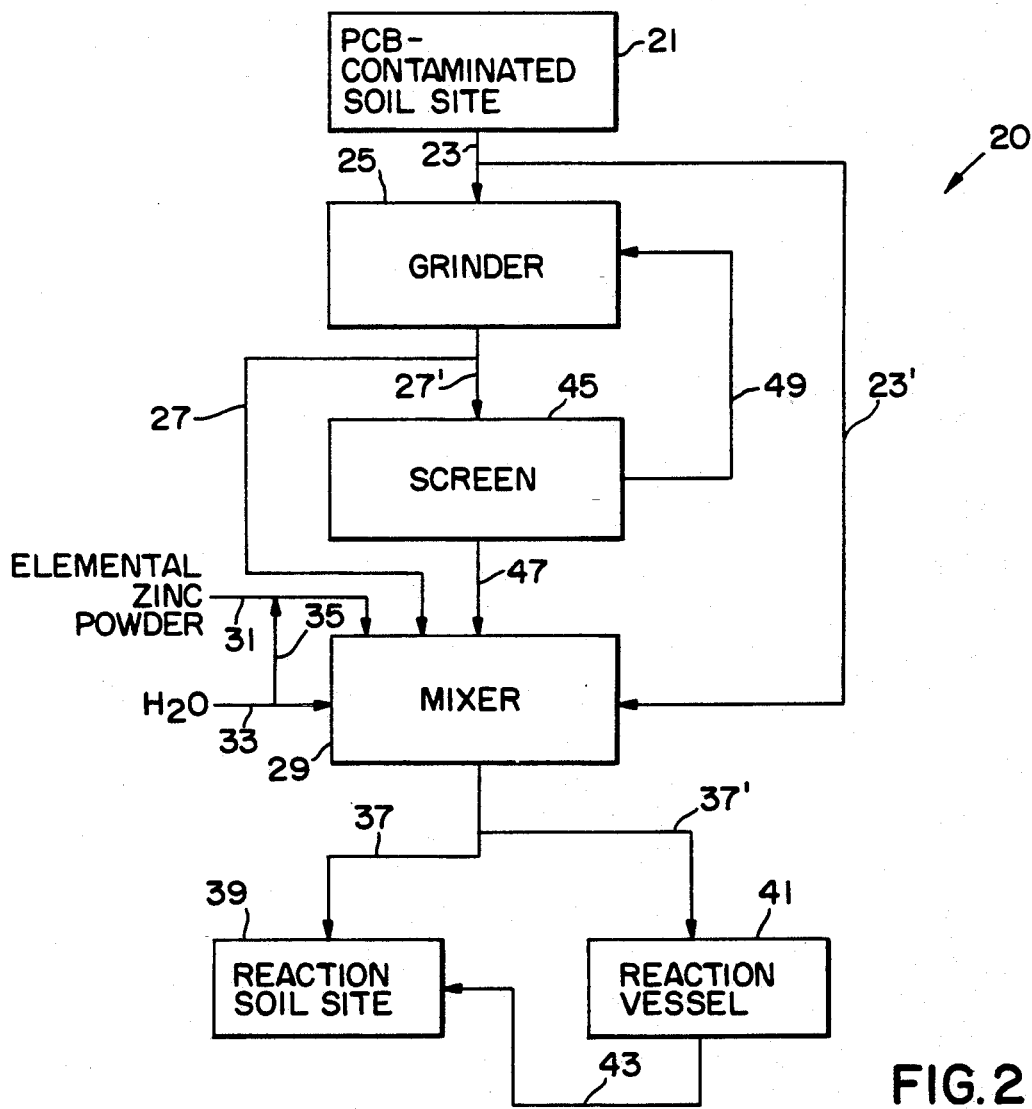
FIG. 2 shows a process flow diagram illustrating different embodiments of the inventive method and apparatus.

With reference now to FIG. 2, the method and apparatus aspect of the present invention will now be described. FIG. 2 shows a schematic flow sheet of the present invention which is generally designated by the reference numeral 20. In a first embodiment, a PCB-contaminated soil site 21 is identified for treatment using the inventive process. Contaminated soil 23 is removed from the PCB-contaminated soil site 21 and charged to a grinder 25 for size reduction. The grinder may be any known type in the prior art such as a hammer mill, ball mill, rod mill or the like to comminute the contaminated soil. The size of the contaminated soil should be such that sufficient surface area is available to permit the reaction process as described below to effectively dechlorinate the polychlorinated biphenyls contained in the soil.

The discharge 27 from the grinder is fed to a mixer 29. At this stage in the process, an amount of elemental zinc powder 31 and a quantity of water 33 is charged to the mixer. The mixer agitates the mix of soil, water and elemental zinc powder to uniformly distribute the zinc powder in the soil. The mixer may be any known type in the prior art such as a mixer-muller or rotary drum type. Alternatively, the grinding and mixing step of the inventive process may be performed in a single unit such as ball mill wherein the elemental zinc powder and water are added thereto to perform simultaneously grinding and mixing of the various components. Furthermore, the water 33 may be diverted via line 35 to form an elemental zinc powder containing slurry for charging to the mixer 29.

The discharge 37 from the mixer is then discharged to a reaction soil site 39 to permit the elemental zinc powder and water to react under ambient pressure and temperature with the polychlorinated biphenyls in the soil to effect the dechlorination thereof. In an alternative embodiment, the mixer discharge may be diverted as reference numeral 37' to a reaction vessel 41. The reaction vessel 41 permits the reaction to occur between the elemental zinc powder, water and polychlorinated biphenyls to effect dechlorination thereof. Once sufficient dechlorination has taken place, the at least partially dechlorinated soil is discharged as reference numeral 43 from the reaction vessel 41 to a reaction soil site 39 or other disposal area.

In an alternative embodiment, a screening means 45 may be disposed between the grinder 35 and mixer 29 as a further control over soil size prior to discharge into the mixer 29. In this embodiment, discharge from the grinder 27' is passed through the screening means 45 to discharge a desired size range of soil 47 to the mixer. The screening means 45 includes an oversize return 49 to the grinder 35 for further size reduction.

In a further embodiment, the PCB-contaminated soil 23 derived from the soil site 21 may be directly charged into the mixer 29 via the by-pass route 23'. In this embodiment, the size range of the contaminated soil 23 removed from the soil site 21 is sized naturally such that the required intermixing of elemental zinc powder with the soil can be achieved in the mixer 29 without the need for soil comminution.

Although not depicted in FIG. 2, and in a further embodiment, the elemental zinc powder may be directly added to the PCB-contaminated soil site 21. In this embodiment, mobile mixing means are provided to mix the elemental zinc powder into the soil in an in-situ manner. An example of a mobile mixing means would include a rotatilling machine or similar machine. In this embodiment, complete in-situ treatment of the PCB-contaminated soil may be performed without the requirement of removing the contaminated soil from the soil site to effect grinding, screening and/or mixing prior to effecting the reaction step. In this in-situ embodiment, addition of water is dependent upon the moisture content of the soil. If the contaminated soil is relatively dry and located in an area that receives little rainfall, water would be required along with addition of the elemental zinc. However, if the contaminated soil includes sufficient moisture, water additions may be optional or made at a reduced rate.

The following examples are presented to illustrate the invention but the invention is not considered to be limited thereto. The examples demonstrate the successful treatment of PCB-contaminated soil in an in-situ manner without endangering the environment.

The following experimental procedure was utilized in illustrating the effects of elemental zinc powder on PCB-contaminated soil. A sample of clean soil was contaminated to approximately 1000 ppm of Aroclor ® 1260. As described above, Aroclor ® 1260 represents a polychlorinated biphenyl having 60 percent chlorine by weight of the mixture. 25 grams of the Aroclor ® 1260 contaminated soil was mixed with 25 grams of elemental zinc powder and 50 grams of water and allowed to react at room temperature. It should be noted that the soil was sized to a range of between about 100 to 200 Tyler mesh, with the elemental zinc powder being in the same approximate range. After the mixture was allowed to react, the mixture was sampled at two week intervals.

After sampling, chromatography was performed on the samples to analyze the extent of polychlorinated biphenyls in the sample over time. Since the analysis of materials using chromatography is well known in the art, a detailed description of the chromatographal analysis method is not included herewith. In general, the chromatograph depicts a graph of the chromatography machine response versus retention time. The more a particular compound is present in the sample, the greater the machine response. Moreover, each compound has a unique retention time and in the case of polychlorinated biphenyls, the more highly chlorinated congeners have progressively greater retention times. Each peak of the chromatograph corresponds to the concentration of a single congener, or a group of closely related congeners. If the shape of the graph does not change over time, then the same relative amounts of each congener are still present in a given sample.

Figure 3:
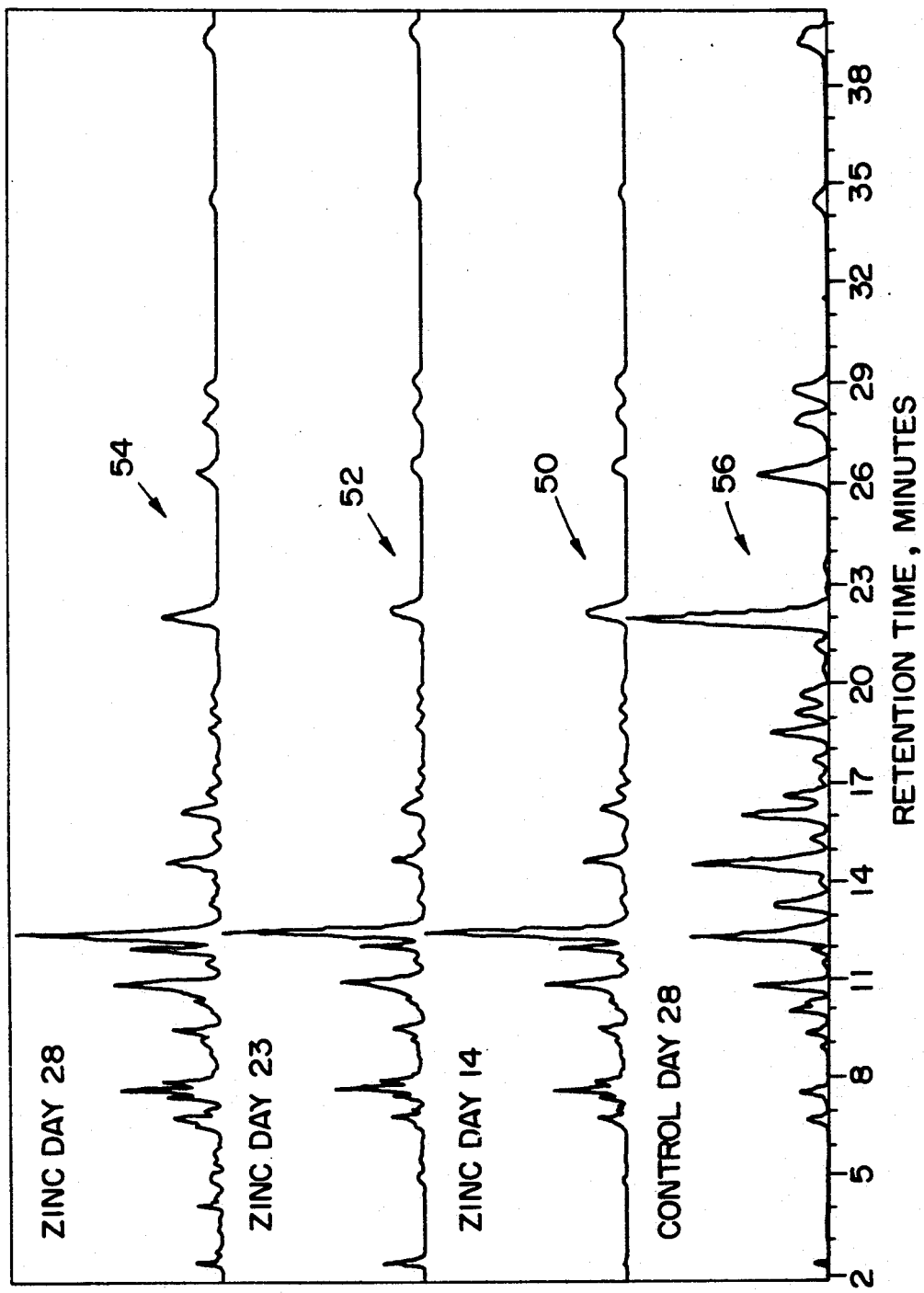
FIG. 3 shows a chromatograph illustrating a reduction in concentration of highly chlorinated polychlorinated biphenyls.

With reference now to FIG. 3, four chromatographs are illustrated. Chromatographs 50, 52 and 54 illustrate the effects of elemental zinc over time on the concentration of the various congeners of the polychlorinated biphenyls. The effect of the elemental zinc is further illustrated when comparing the chromatographs 50, 52 and 54 to the control day 28 chromatograph 56. As can be seen from chromatograph 56, after 28 days, the soil containing no elemental zinc still contains a high concentration of polychlorinated biphenyls. Moreover, the more highly chlorinated biphenyls still remain as evidenced by the peaks associated with retention times over 14 minutes.

In contrast, the chromatographs obtained after the contaminated soil has been in contact with elemental zinc show significant reductions in highly chlorinated congeners. With particular reference to chromatograph 50, the congener makeup of the Aroclor ® shifted to include a lower concentration of the more highly chlorinated congeners as evidenced by the reduced peak heights for retention times after 14 minutes and a higher concentration of less highly chlorinated congeners as evidenced by the increased peak heights for retention times less than 14 minutes.

Figure 4:
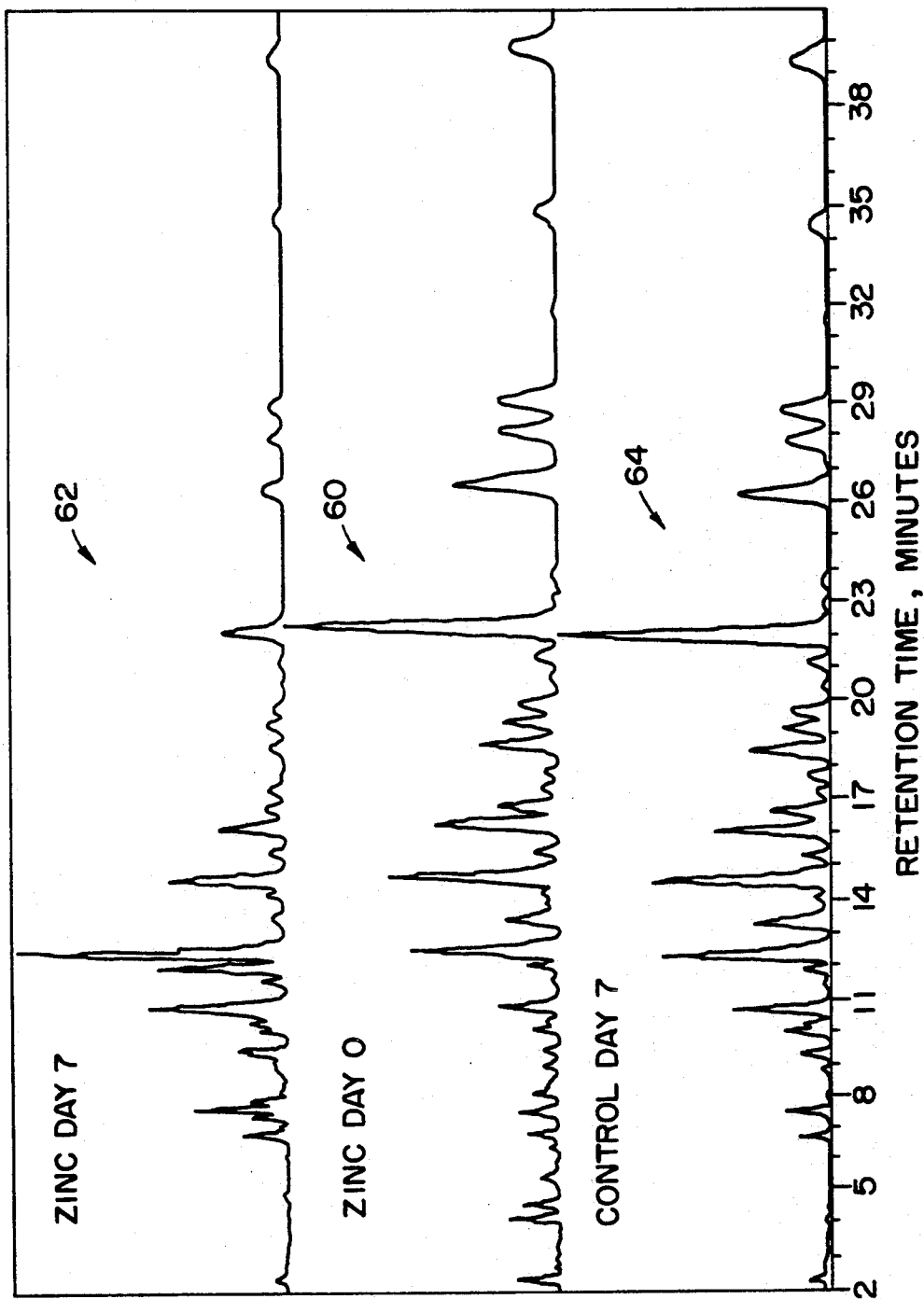
FIG. 4 shows another chromatograph confirming test results obtained and as illustrated in FIG. 3.

With reference now to FIG. 4, another run of the experiment was performed duplicating the conditions as set forth above. In FIG. 4, a chromatograph is depicted as reference numeral 60 showing the concentration of the various congeners of the polychlorinated biphenyls when zinc is added to the contaminated soil at the initiation of the experiment. Chromatograph 62 shows the concentration after 7 days of reacting the zinc with the polychlorinated biphenyls. When comparing chromatographs 60 and 62, a lower concentration of the more highly chlorinated congeners, having retention times greater than 14 minutes, results after a time lapse of 7 days with an increase of the less highly chlorinated congeners, having retention times less than 14 minutes.

Chromatograph 64 depicts a control sample measurement after 7 days without addition of zinc. When comparing chromatographs 60 and 64, it is evident that no change occurs in the various concentration levels of the polychlorinated biphenyls when zinc is absent from the soil.

Based upon the data illustrated in FIGS. 3 and 4, treating PCB-contaminated soil with elemental zinc results in at least partial dechlorination of the PCB content of the soil. Moreover, the partial dechlorination is effected without endangering the environment through emissions of other toxic substances. It is believed that further dechlorination would occur over a period of time extending beyond the time intervals depicted in FIGS. 3 and 4. It is anticipated that dechlorination according to the inventive process could effect up to 99 percent reduction in levels of polychlorinated biphenyls in contaminated soils over a period of several years.

It should be understood that although the amount of elemental zinc utilized in the above experiments was approximately equal in weight to the amount of contaminated soil, more or less amounts of zinc may be utilized to effectively partially dechlorinate the PCB content of the contaminated soil. The amount of zinc may be based upon the percentage of PCBs in the contaminated soil as well as the types of PCB congeners therein. For example, if the contaminated soil has a high level of PCB content, more elemental zinc may be necessary to effectively dechlorinate the polychlorinated biphenyls in the soil. Alternatively, less elemental zinc may be needed if the contaminated soils contain only small amounts of PCBs. Since the 1 to 1 weight ratio between elemental zinc powder and contaminated soil described in the experiments above far exceeds the stoichiometric requirements of elemental zinc to form zinc chlorides from the PCB materials, the 1 to 1 ratio is a preferred ratio for determining an effective amount of elemental zinc per unit weight of contaminated soil.

Through the above experimental procedures, a certain amount of moisture is required to effect the dechlorination reaction. Although exact values have not been determined, the contaminated soil should have a moisture content such that the contaminated soil is at least dampened or in a partially moist state.

During the experiments, the pH of the contaminated soil during the reaction step was measured as between 9 and 11. However, it is believed that the inventive process would function to dechlorinate the polychlorinated biphenyls in a soil under acid conditions as well.

It should also be understood that the zinc powder should be in the form of elemental zinc. Experiments performed using zinc oxide did not produce effective dechlorination of the polychlorinated biphenyls over a given period of time.

Although the experiments show a preferred size range of the contaminated soil and zinc powder to be between 100 and 200 Tyler mesh, i.e. between 74 and 149 microns, larger particles sizes may be utilized to effect the reaction between the elemental zinc, water and PCB in the contaminated soils. Particle sizes for the contaminated soil and zinc could range up to 3/16 inch.

As such, an invention has been disclosed in terms of preferred embodiments thereof which fulfill each and every one of the objects of the present invention as set forth hereinabove and provides a new and improved method of and apparatus for treating polychlorinated biphenyl contaminated soils.

Of course, various changes, modifications and alterations from the teachings of the present invention may be contemplated by those skilled in the art without departing from the intended spirit and scope thereof. Accordingly, it is intended that the present invention only be limited by the terms of the appended claims.

We claim:

1. A method of treating polychlorinated biphenyl-containing soil comprising:
   a) providing a moistened soil containing an amount of polychlorinated biphenyls therein;
   b) adding an amount of elemental zinc in powder form to said moistened soil as the sole material added thereto;
   c) mixing said elemental zinc in powder form with said moistened soil to provide a mixture thereof; and
   d) reacting said elemental zinc in powder form with said polychlorinated biphenyls at ambient temperature and pressure over a predetermined period of time, said elemental zinc powder being in an amount effective to at least partially dechlorinate said polychlorinated biphenyls in said moistened soil.

2. The method of claim 1 wherein said providing comprises providing an in-situ soil site having said moistened soil containing an amount of polychlorinated biphenyls therein.

3. The method of claim 2 further comprising comminuting said moistened soil prior to said adding.

4. The method of claim 3 wherein said moistened soil has a particle size generally less than 3/16 inch.

5. The method of claim 1 wherein said providing further comprises removing said moistened soil from a soil site prior to said adding.

6. The method of claim 5 further comprising adding an amount of water to provide said moistened soil prior to said reacting.

7. The method of claim 6 wherein said adding and mixing are performed in a mixing means.

8. The method of claim 7 further comprising returning said moistened soil to said soil site.

9. The method of claim 1 wherein said providing comprises adding an amount of water to provide said moistened soil for said reacting.

10. The method of claim 1 wherein said predetermined period of time exceeds 7 days.

* * * * *